March 7, 1944.　　　R. I. SCHONITZER　　　2,343,810

COMBINED DOOR-HINGING, DOOR-CHECKING, AND DOOR-HOLDING DEVICE

Filed Aug. 2, 1940

INVENTOR.
RUDOLPH I. SCHONITZER
BY Hyde and Meyer.
ATTORNEYS

Patented Mar. 7, 1944

2,343,810

UNITED STATES PATENT OFFICE 2,343,810

COMBINED DOOR-HINGING, DOOR-CHECK-ING, AND DOOR-HOLDING DEVICE

Rudolph I. Schonitzer, Shaker Heights, Ohio

Application August 2, 1940, Serial No. 349,888

2 Claims. (Cl. 16—140)

This invention relates to combined door-hinging, door-checking and door-holding devices, the use with a door and its supporting structure of a device embodying the present invention (1) enabling said door to be hinged (by parts which are concealed when the door is closed) on its supporting structure, it being understood that one or more other hinge means generally will be used for the complete hinging of said door; (2) enabling the opening movement of said door to be checked or arrested when said door reaches the position desired for its fully open position; and (3) enabling said door to be releasably held or retained against closing from a predetermined open position, such as the fully open position of said door.

The present invention has for its general objects the provision of a device of the character described by which two or all three of the aforesaid functions may be effectively accomplished, the construction of such device and the arrangement of its parts being such that said device may be inexpensively manufactured and easily assembled with a door and its supporting structure.

Although the field of use of the present invention obviously is not limited to automobile doors, devices embodying such invention are particularly useful therewith, as will hereinafter appear.

More specific objects of the present invention are in part obvious and in part will appear more in detail hereafter.

Figure 1:
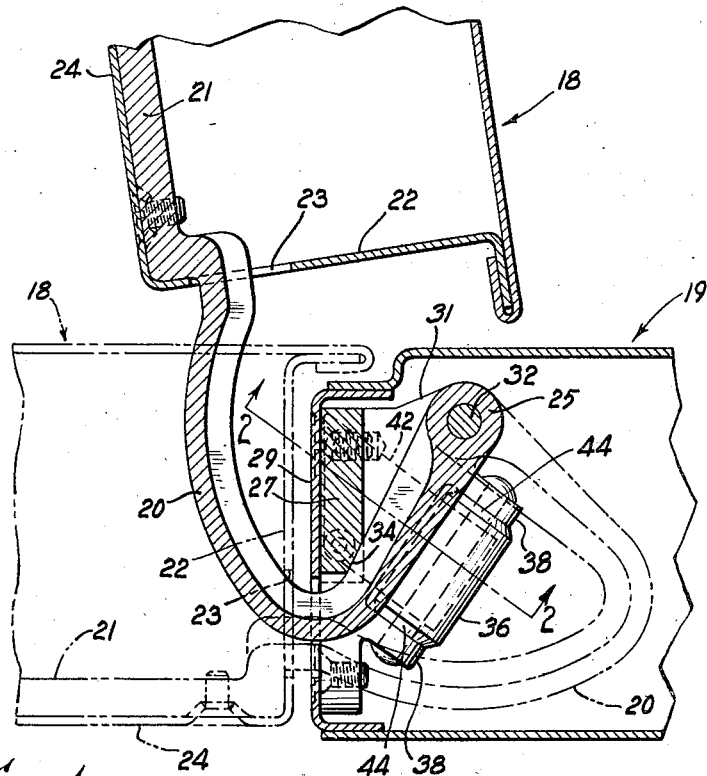
Figure 2:
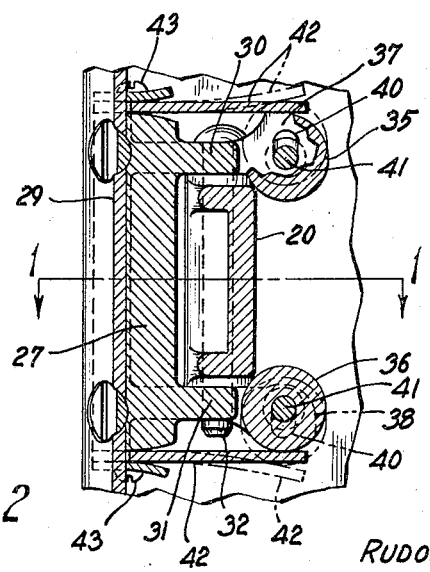

The present invention will be readily understood from the following description of one embodiment thereof as used with an automobile door, reference being had to the accompanying drawing in which Fig. 1 is a longitudinal horizontal sectional view through the hinge edge portion of an automobile door and a corresponding portion of the automobile body on which said door is hinged by the use of a device embodying the present invention, the view being on the line 1—1, Fig. 2, the door being shown in full lines in its fully open position, the position in which it is releasably held or retained by such device, and the closed position of said door being indicated in dot-dash lines; and Fig. 2 is a vertical sectional view, on the line 2—2, Fig. 1.

Before the present invention is described in detail, it is to be understood that such invention is not limited to the details of construction or the specific arrangement of parts herein illustrated or described, as the invention obviously may take other forms. It also is to be understood that the phraseology or terminology herein employed is for the purpose of description and not of limitation.

In the accompanying drawing, wherein is illustrated one form of device embodying the present invention, the reference numeral 18 designates a generally hollow sheet metal automobile door, such as is now in general use, and of which door only the hinge edge portion is here shown; and 19 designates the automobile body portion (hereinafter termed a body pillar) on which said door is hinged by said device, it being understood that other hinge means (not here shown) generally will be used in conjunction with the present device for the complete hinging of said door on said body pillar.

As best shown in Fig. 1, the device constituting the herein illustrated embodiment of the present invention includes a hinge leaf 20 of the so-called goose neck form, one end of said hinge leaf being pivotally secured to or associated with the body pillar 19 and the other end of said hinge leaf being rigidly or immovably secured to or associated with the door 18. As a result, said door not only is supported on said body pillar (and in the appended claims, said body pillar is designated as a supporting structure for the door structure hinged thereon) but also, is free to swing about its hinge axis (to be later referred to) between its fully closed position, indicated in dot-dash lines in Fig. 1, and its fully open position, shown in full lines in Fig. 1, all as will be readily understood.

As here shown, the rigidly secured end portion 21 of the hinge leaf 20 lies within the hinge edge portion of the door 18 (the hinge edge wall 22 of said door being provided with a suitable opening 23 to receive such end portion of said hinge leaf) and is screwed or otherwise immovably secured to the sheet metal inner side wall 24 of said door, said door being provided, as is usual, with a suitable trim panel or the like (not shown) by which its inner side wall 24 is desirably covered. For the pivotal connection of the other end 25 of said hinge leaf to the body pillar 19, a suitable metal bracket, of generally U shape in vertical section, is here utilized, said bracket being arranged within said body pillar and having its generally vertical base 27 screwed or otherwise rigidly secured to the body pillar hinge edge wall 29, said bracket base and said body pillar wall being provided with aligned apertures or openings for the extension therethrough of said hinge leaf. Extending through rearwardly disposed, vertically spaced and substantially horizontal lugs 30 and 31 of said bracket is a pintle 32 upon which said hinge leaf is pivotally mounted, the upper bracket lug 30 being spaced sufficiently from the lower bracket lug 31 to permit said hinge leaf to swing therebetween as the door 18 is opened and closed.

Although the opening movement of said door may be checked or arrested in various ways by the device constituting this embodiment of the present invention, when said door reaches the position desired for its fully open position (the full line position of said door in Fig. 1) the checking or arresting of said door is here effected by the engagement of the hinge leaf 20 with the bracket base 27, as clearly indicated in Fig. 1. If desired and as here shown, the portion 34 of said bracket base which constitutes the cooperating abutment for said hinge leaf, in checking or arresting the opening movement of the door 18, may be of inclined or bevelled character to enable it to more effectively contact and cooperate with said hinge leaf in the accomplishment of this door-checking or door-arresting function.

For the releasable retention of the door 18 in its fully open position, whenever it is moved thereto, the present device includes two elongated retaining rollers 35 and 36, which are carried by rearwardly extending ears with which the rigid bracket lugs 30 and 31 are suitably provided, there being an upper pair of laterally spaced ears 37 integral with the upper bracket lug 30 and in which the upper retaining roller 35 is journalled and a lower pair of correspondingly spaced ears 38 integral with the lower bracket lug 31 and in which the lower retaining roller 36 is journalled. To permit convergent and divergent movement of said rollers, or movement thereof toward and from each other, the bracket lug ears 37 and 38 are provided with generally vertical slots 40 for the reception of the roller shafts 41, as clearly shown in Fig. 2. To normally urge said rollers toward each other, for cooperation with the hinge leaf 20 in releasably holding or retaining the automobile door 18 in its fully open position, a pair of leaf springs 42 are here utilized, the front end portions of said springs being suitably anchored, as at 43, and the rear end portions of said springs so engaging said rollers (the rollers being located between the free rear end portions of said springs) that said rollers normally tend to converge or move toward each other.

During opening movement of the door 18, the hinge leaf 20 swings in a clockwise direction, Fig. 1, and just before said door reaches its fully open position, the generally parallel rollers 35 and 36 carried by the bracket lug ears 37 and 38 are engaged by that portion of said hinge leaf which is adjacent its pivot, the effect of which is sufficient divergent movement of said rollers (against the convergent forces of their springs 42) to permit said hinge leaf portion to move forwardly between and beyond said rollers, as shown in Fig. 2. As soon as said hinge leaf portion passes said rollers, the ends 44 of which rollers may be bevelled, if desired and as here shown (see Fig. 1) to insure proper engagement with said hinge leaf portion, the springs 42 return said rollers to their minimum spaced relationship, here determined by the bracket lug ear slots 40 in which the roller shafts 41 move. Return or counterclockwise movement of the hinge leaf 20 (and hence closing movement of the door 18) is therefore yieldingly resisted by said rollers and said door is thus releasably held or retained in its fully open position, as will be readily understood.

As will be readily understood, the foregoing embodiment of the present invention is particularly advantageous where a limited amount of space is available, in a fore and aft direction, in the door supporting structure, such as in an automobile body center pillar and the like.

Other features and advantages of the present invention will be readily apparent to those skilled in the art to which it relates.

What I claim is:

1. A combined door-hinging and door-holding device, comprising a hinge leaf of generally gooseneck form for securement to a door and for extension into the door supporting structure through an opening in the hinge edge wall thereof, a bracket for enclosure by said door supporting structure, said bracket having a base for rigid securement to said door supporting structure and also having a pair of spaced and generally parallel rigid lugs connected to said base and to which lugs said hinge leaf is pivotally connected for swinging movement therebetween, each of said lugs having a pair of spaced and slotted ears, the slots of said ears extending substantially normal to the plane of movement of said hinge leaf, an elongated roller mounted in the slots of the ears of each of said lugs, said rollers being disposed in generally parallel relation and said ear slots permitting said rollers to be bodily moved into and out of the path of movement of said hinge leaf, and a pair of leaf springs carried by said bracket and effective upon said rollers to normally urge said rollers into the path of movement of said hinge leaf, whereby when said door reaches a predetermined open position, said rollers are engaged by said hinge leaf and upon further opening movement of said door, said rollers are divergently or oppositely moved by said hinge leaf to permit said hinge leaf to pass between and substantially beyond said rollers, the return of said rollers into the path of movement of said hinge leaf after said hinge leaf has passed substantially beyond said rollers enabling said rollers to yieldingly resist closing movement of said door.

2. A combined door-hinging, door-holding and door-checking device, comprising a hinge leaf of generally goose-neck form for securement to a door and for extension into the door supporting structure through an opening in the hinge edge wall thereof, a bracket for enclosure by said door supporting structure, said bracket having a base for rigid securement to said door supporting structure and also having a pair of spaced and generally parallel rigid lugs connected to said base and to which lugs said hinge leaf is pivotally connected for swinging movement therebetween, each of said lugs having a pair of spaced and slotted ears, the slots of said ears extending substantially normal to the plane of movement of said hinge leaf, an elongated roller mounted in the slots of the ears of each of said lugs, said rollers being disposed in generally parallel relation and said ear slots permitting said rollers to be bodily moved into and out of the path of movement of said hinge leaf, and a pair of leaf springs carried by said bracket and effective upon said rollers to normally urge said rollers into the path of movement of said hinge leaf, whereby when said door reaches a predetermined open position, said rollers are engaged by said hinge leaf and upon further opening movement of said door, said rollers are divergently or oppositely moved by said hinge leaf to permit said hinge leaf to pass between and substantially beyond said rollers, the return of said rollers into the path of movement of said hinge leaf after said hinge leaf has passed substantially beyond said rollers enabling said rollers to yieldingly resist closing movement of said door, said hinge leaf being engageable with said bracket base upon the passage of said hinge leaf beyond said rollers to thereby check or arrest further opening movement of said door.

RUDOLPH I. SCHONITZER.